Dec. 31, 1940.  E. KOMENDA  2,227,142
MOTOR VEHICLE
Filed Sept. 25, 1939
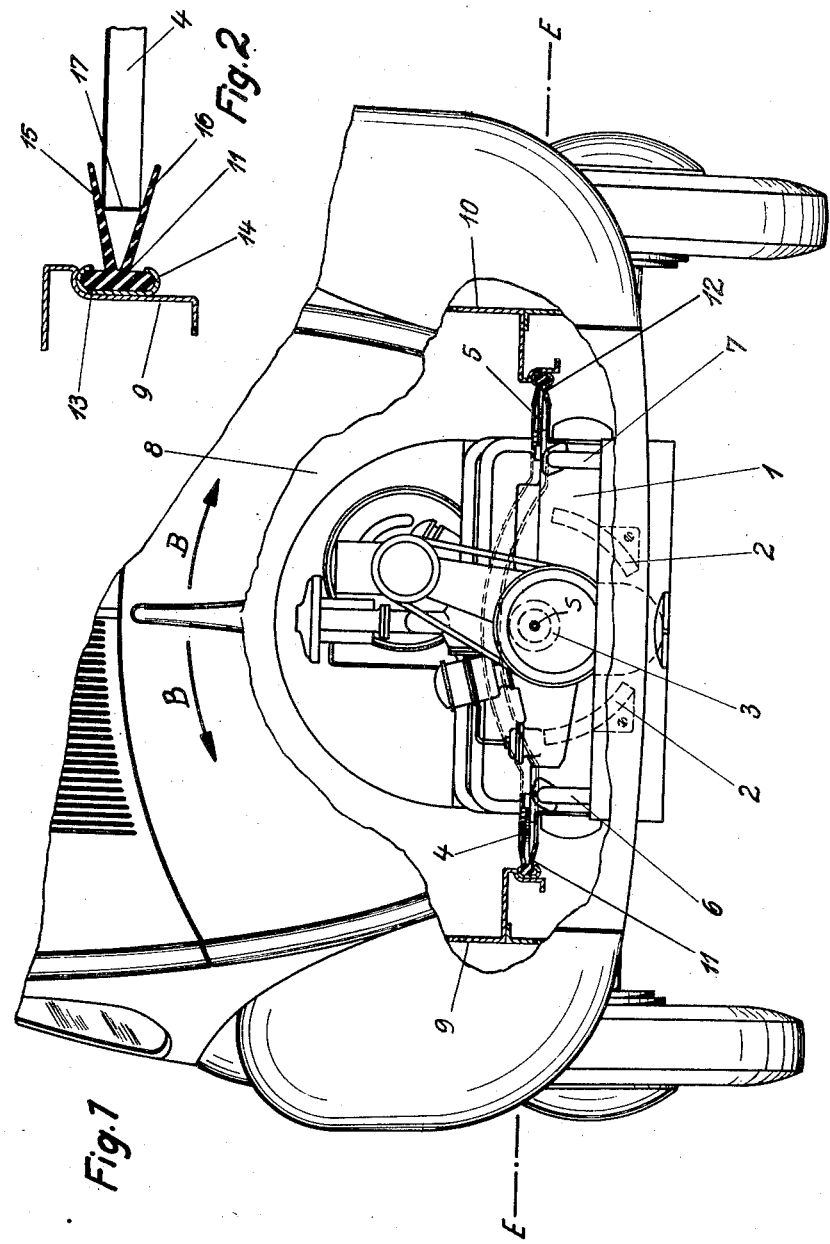
INVENTOR
ERWIN KOMENDA
BY
ATTORNEYS Patented Dec. 31, 1940

2,227,142

UNITED STATES PATENT OFFICE 2,227,142

MOTOR VEHICLE

Erwin Komenda, Stuttgart-Korntal, Germany, assignor to Dr. ing. h. c. F. Porsche K.-G., Stuttgart-Zuffenhausen, Germany, a company of Germany Application September 25, 1939, Serial No. 296,468
In Germany September 22, 1938

9 Claims. (Cl. 180—69.1)

This invention relates to a motor vehicle, and more particularly to the manner of mounting and enclosing an engine in a compartment of the vehicle.

An object of this invention is to prevent road dirt and dust from penetrating and affecting a vehicle engine and its auxiliary apparatus.

Another object of this invention is the provision of novel means for enclosing the vehicle engine compartment against the penetration of road dust and dirt.

A further object of this invention is to prevent dirt and dust being sucked up into the engine compartment of a rear-engine motor vehicle.

A more specific object of this invention is to provide a closure member for the bottom of a vehicle engine compartment, which will maintain a sealed closure despite oscillatory movements of the engine relative to the vehicle.

With these and incidental objects in view, the invention consists in certain novel features of construction and combination of parts which are set forth in the appended claims, and a preferred form of embodiment whereof is hereinafter described with reference to the drawing which accompany and form part of the specification, wherein:

Fig. 1 is a rear view of a power vehicle having a rearwardly mounted engine, the vehicle body being partially cut away and partially shown in cross section; and Fig. 2 is an enlarged cross-sectional view of a portion of the closure means for the engine compartment.

Fig. 1 illustrates the general assembly and mounting of a vehicle engine, here shown as one with opposed cylinders, illustrating the application of the arrangement according to the present invention. The engine 1 may be suitably mounted for oscillatory movements about the axis S in the direction of the arrows B—B in suitable rubber bearings 2, 3. The axis S extends substantially parallel to the longitudinal axis of the vehicle, thus being perpendicular to the plane of the drawing. The engine 1 is illustrated as mounted within an engine space 8, in this case formed at the rear of the vehicle in any suitable manner. The engine space 8, as illustrated, and as is usual in automotive vehicles, is substantially open at the bottom thus, unless suitable additional means are used, exposing the engine and its auxiliary apparatus to the dirt and dust of the road.

A novel means for preventing the dirt and dust from ascending into the engine compartment, and for particularly protecting those parts of the engine and its auxiliary devices which would be most affected by such dirt, while at the same time permitting movement of the engine in its resilient support, forms the essence of this invention. Such means may include stiff covering plates 4 and 5 which are preferably rigidly interconnected with the engine at some point intermediate its height, by any means such as suitable bolts.

The plates 4 and 5 thus form the rigid part of the closure member. In order to maintain the closure tight during movement of the engine in its resilient bearings, suitable yieldable means such as the rubber stripping 11 and 12 are attached to the vehicle wall frame 9 and 10. As is best illustrated in the enlarged view of this construction shown in Fig. 2, the stripping may be formed of rubber having a base member 13 clamped within a sheet metal member 14 attached to the frame wall 9 by welding or other suitable means. The base member 13 is provided with a pair of forked arms 15 and 16 which engage opposite sides and project beyond the edge 17 of the stiff member 4 attached to the engine proper. In this manner, it will readily be seen that while the stiff members 4 and 5 will oscillate with movement of the engine 1, their edges 17 will be retained in close contact with at least one of the forked arms 15 and 16 pressing against them. Accordingly, an effectively sealed closure is obtained which will not permit entry of the dust or dirt of the road above the sealed closure. The yieldable closure member and the stiff plates 4 and 5 are preferably positioned in the plane E—E passing through the center of oscillation S of the engine, so that the relative movement between the resilient and stiff closure members will be a minimum. It will be noted that in the form illustrated the exhaust pipes 6 and 7 are positioned below the closure member, the closure member being raised if necessary in order to permit this construction. By means of this arrangement the exhaust pipes do not have to extend through the closure member and therefore the use of special careful sealing means is avoided.

While it is possible to reverse the positions of the relatively stiff and yieldable parts of the closure, that is, the rubber might be mounted on the engine and the stiff plate to the frame walls of the vehicle, the construction illustrated is preferable since the resilient rubber members are then not directly exposed to the high temperatures emanating from the engine.

It will be obvious to those skilled in this art that many modifications of the instant construction fall within the scope of the present invention. While the particular closure has been illustrated in connection with a rear engine vehicle, where it is of particular importance due to the fact that in such a vehicle a suction effect arises in the engine compartment, tending to draw up the dust and dirt from the road, the principles of the invention are equally applicable to a construction in which the engine is forwardly mounted. Additionally, the particular type of interconnection between the stiff and yieldable parts of the closure need not be followed, nor the manner in which the yieldable part of the closure member is attached to the frame wall. Additionally, it is contemplated that means other than a rubber connector may be used to form the yieldable part of the closure. Rubber-like substances, leather or even a suitable resilient metal connection could be used.

As indicated previously, the closure member need not be positioned relatively to the engine exactly as has been illustrated and described. However, it is at all times preferable that this closure member be so positioned that it will prevent the dirt and dust not only from penetrating the important parts of the engine itself, but also the auxiliary control devices therefor, such, for example, as the carburetter, distributor and the like. It is obviously important that these auxiliary devices be kept free from dirt and dust for proper and efficient operation of the engine as a whole.

It will be seen that I have provided a construction which satisfies the objects enumerated above and while I have shown the invention in a certain physical embodiment, it is to be accordingly understood that modifications of the structure shown may be made by those skilled in this art without departing from my invention as expressed in the following claims:

1. In a vehicle having a frame, an engine yieldably supported relative to the frame, means relatively open at the bottom forming an engine space within the vehicle, and means including relatively stiff and relatively yieldable members for sealing the upper portion of said engine against the open bottom of said engine space, whereby road dust and dirt are prevented from penetrating into the upper portion of said engine, but at the same time relative movement of said engine in its yieldable support is permitted.

2. The combination according to claim 1, in which said relatively stiff members are attached to said engine.

3. The combination according to claim 1, in which said engine is provided with one or more exhaust pipes extending rearwardly from said engine beneath said sealing means.

4. The combination according to claim 1, in which said compartment and the engine therein are positioned at the rear of the vehicle.

5. The combination according to claim 1, in combination with auxiliary power control means for said engine mounted in said engine compartment above said sealing means.

6. In a vehicle, wall frame members forming an engine compartment open at the bottom, an engine yieldably mounted in said compartment, means for sealing the upper part of said engine against the open compartment bottom comprising a covering formed of overlapping relatively stiff and yieldable members connected to said engine and said wall frame members.

7. In a vehicle, wall frame members forming an engine compartment in said vehicle, open at the bottom, an engine pivotally supported within said compartment, a stiff plate on said engine adapted to close the bottom of said compartment, and yieldable means on said wall frame members engaging said stiff plate to form a sealed closure despite relative movement of said engine.

8. The combination according to claim 7, in which said yieldable means includes a stripping having a pair of forked arms of rubber-like material, attached at their fork to the wall frame members and engaging opposite sides of said stiff plate.

9. The combination according to claim 7, in which said yieldable means includes a stripping having a pair of forked arms of rubber-like material, attached at their fork to the wall frame members and engaging opposite sides of said stiff plate, said stripping being positioned in a plane passing through the pivotal axis of the engine.

ERWIN KOMENDA.